(No Model.)  3 Sheets—Sheet 1.
H. G. O'NEILL.
CASH REGISTER AND INDICATOR.
No. 480,613.  Patented Aug. 9, 1892.
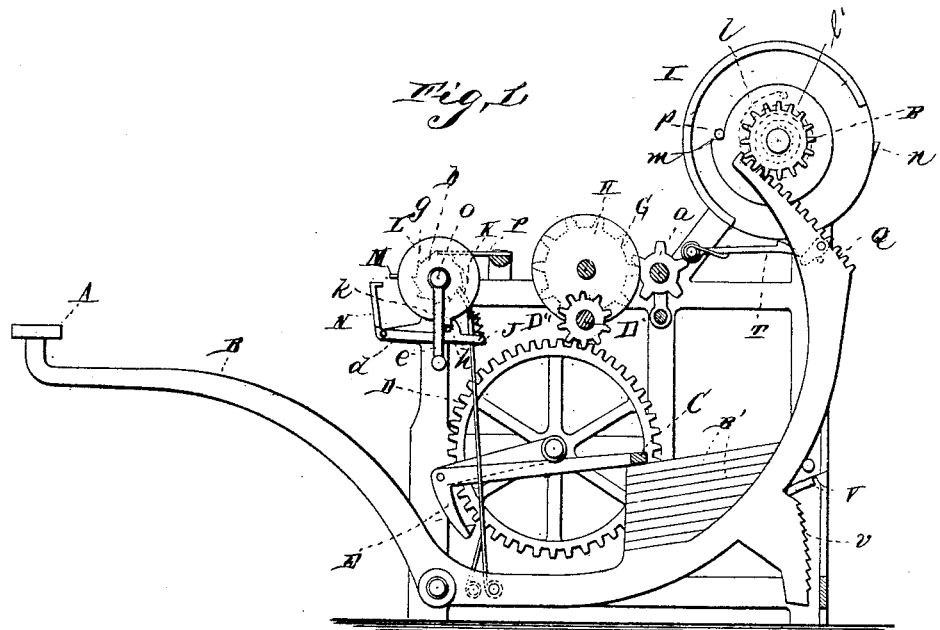
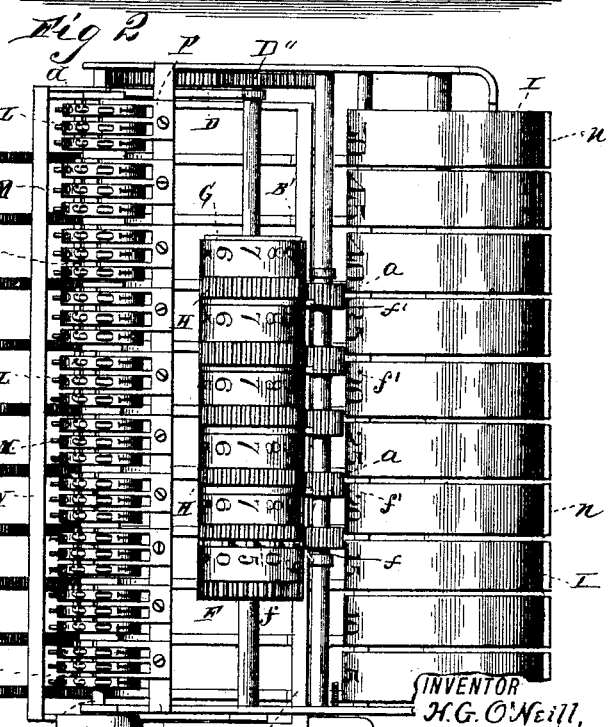
WITNESSES:
INVENTOR
H. G. O'Neill,
BY E. W. Anderson.
his
ATTORNEY.

(No Model.) 3 Sheets—Sheet 2.
H. G. O'NEILL.
CASH REGISTER AND INDICATOR.
No. 480,613. Patented Aug. 9, 1892.
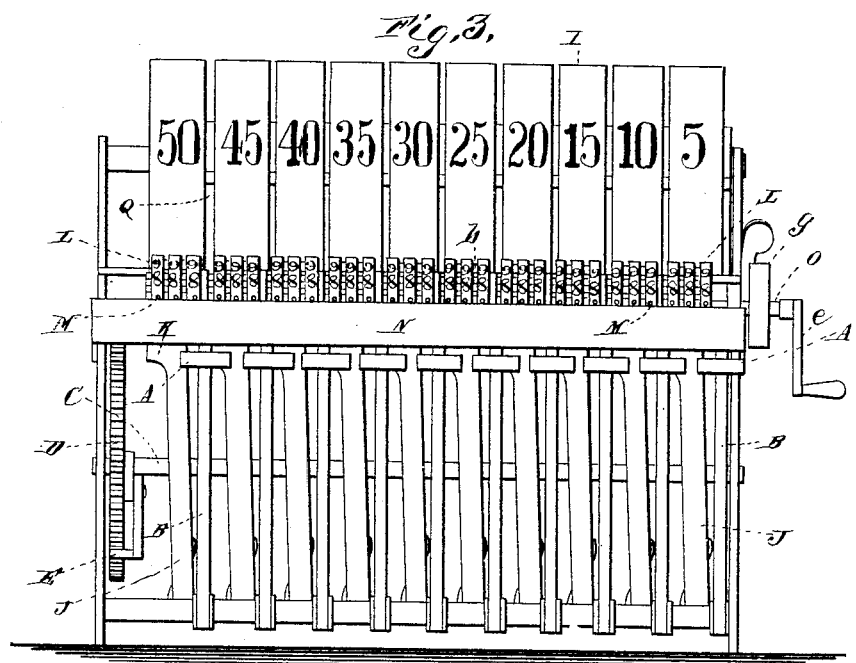
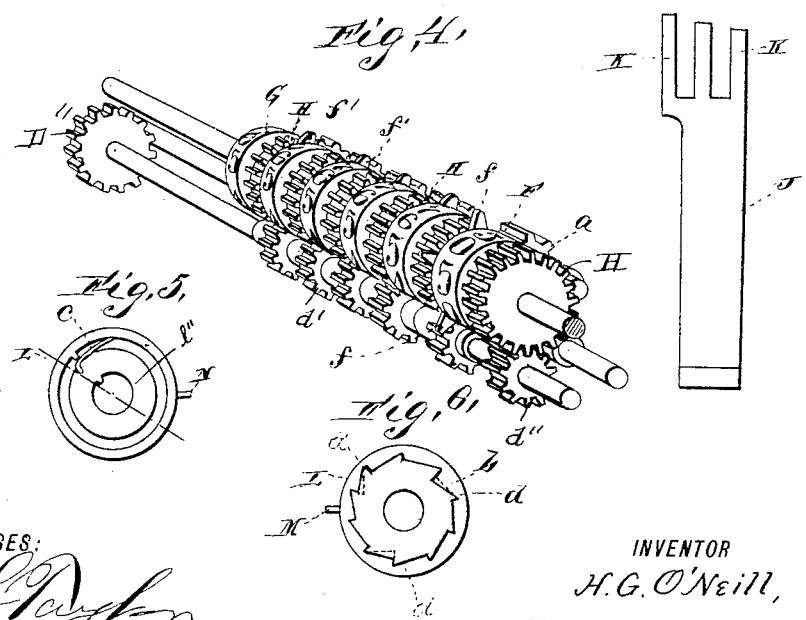
WITNESSES:
INVENTOR
H. G. O'Neill,
BY E. W. Anderson
his ATTORNEY.

(No Model.)  3 Sheets—Sheet 3.
H. G. O'NEILL.
CASH REGISTER AND INDICATOR.
No. 480,613.  Patented Aug. 9, 1892.
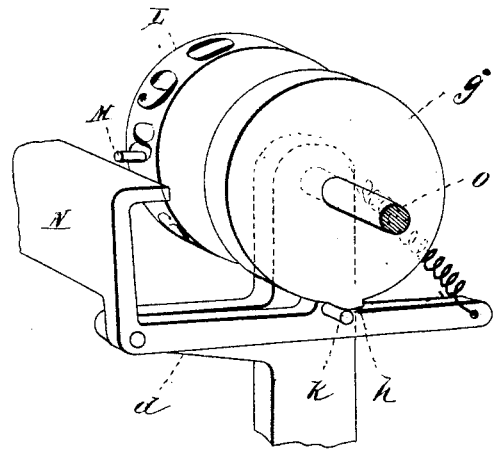
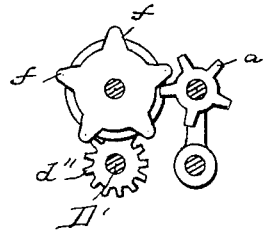
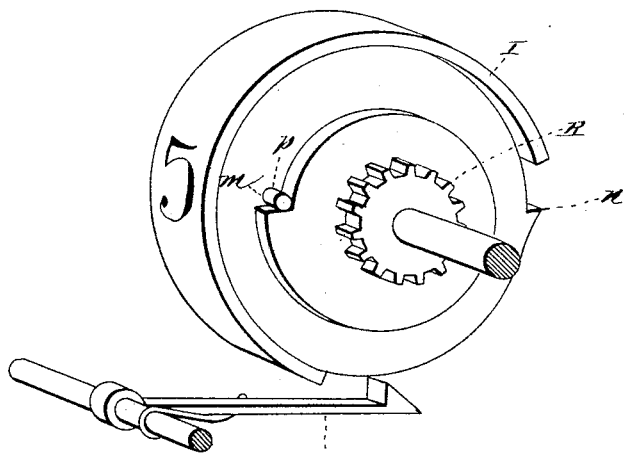
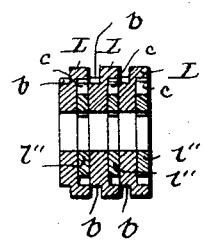
WITNESSES:
INVENTOR
H. G. O'Neill.
BY E. W. Anderson
his ATTORNEY.

UNITED STATES PATENT OFFICE.

HENRY G. O'NEILL, OF LOUISVILLE, KENTUCKY, ASSIGNOR TO THE STANDARD REGISTER COMPANY, OF BOSTON, MASSACHUSETTS.

CASH REGISTER AND INDICATOR.

SPECIFICATION forming part of Letters Patent No. 480,613, dated August 9, 1892.

Application filed November 22, 1890. Serial No. 372,387. (No model.)

*To all whom it may concern:*

Be it known that I, HENRY G. O'NEILL, a citizen of the United States, and a resident of Louisville, in the county of Jefferson and State of Kentucky, have invented certain new and useful Improvements in Cash-Registers; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is an end view partly in section. Fig. 2 is a top plan view of same. Fig. 3 is a front view. Fig. 4 is a detail perspective view of the digit-wheels. Figs. 5 and 6 are details of one of the numbering-wheels. Fig. 7 is a detail view. Fig. 8 is a detail of one of the indicator-wheels. Fig. 9 is a detail of the forked pawl for the itemizing-wheels. Fig. 10 is an enlarged detail of a portion of the adding mechanism. Fig. 11 is a section through the center of a set of the individual numbering-wheels.

This invention appertains to that class of devices known as "cash-registers," and is designed to be used as an automatic accountant, differing from other machines, inasmuch as it itemizes and preserves not alone a register of each individual transaction, grading or classifying the same, but also gives the aggregate of all sales in one line, so that the entire state of the business may appear at a glance, and by itemizing, as well as giving the total, a perfect check is kept on all money received and sales made.

I am aware that devices exist whereby the detailed sales of the day are automatically registered by one class of machines and that by other devices the total sales are given, while each time the individual sale is indicated in each case; but what I have devised, and therefore desire to secure by Letters Patent, is the machine, with its various combinations, as hereinafter set forth, that both preserves the register of each transaction and gives the total of all sales at the same time.

The following specifications refer to letters as used in the accompanying drawings.

A represents a series of keys, which in the drawings illustrating the invention, carry numbers running from "5" in multiples of five up to any desired sum, said keys operating and depressing a series of levers B, provided with the graduated engagement-lugs B', connected therewith, which in turn, acting upon a transverse bail-lever C, tend to move a toothed wheel D a number of notches corresponding to the amount intended to be registered, as represented by said key. Said wheel D is operated upon by a dog or pawl E, connected to or carried by an arm of the bail C, so that as said bail is actuated by the keys the pawl will be actuated to operate said wheel.

F designates the first wheel of a series of digit-adding wheels loosely mounted on a common shaft, the others of the series being designated by G. Said wheel F is marked around its periphery with "0" and "5" alternately, and from its outer flange or side between each "0" and "5" projects a spur-like tooth $f$. The wheels G are each marked with the digits "1" to "9," inclusive, and "0," equidistant on their peripheries, and each has one spur or tooth $f'$, similar to the spur $f$ on the wheel F. This spur or tooth $f'$ is located between the 9 and 0 marks and projects beyond the periphery in the same manner as the spur $f$ of the wheel F. Each of these wheels F and G has rigidly secured thereto a toothed wheel H, and near the series, at the rear thereof and parallel therewith, is a series of pinions $a$, mounted upon a shaft, which is supported upon the frame in such a manner as to enable it to be moved so as to bring the pinions into or out of engagement with the toothed wheels H. Underneath the shaft of the adding-wheels F and G is a second shaft D', carrying a pinion D'', which is in engagement with the wheel D. On this shaft is a series of pinions $d'$ $d''$. The pinion $d''$ is designed to have engagement with the gear-wheel H of the first wheel F of the adding series, while the pinions $d'$ are normally out of engagement with the gear H of the wheels G. When the shaft D' is actuated by the depression of a key through the medium of the bail C and gear-wheel D, the first wheel F will be turned through a corresponding arc. At the proper time the spur-teeth $f$ will engage the first pinion $a$, which is in engagement with the gear H of the first wheel G, actuating said pinion, and thereby causing said wheel G to carry the proper amount. When the first wheel G has made an entire revolution, its spur comes into engagement with the second pinion $a$, and thereby effects the proper carrying to the second wheel G. By moving the shaft of the pinion $a$ on its support said pinions may be carried back out of engagement with the gear-wheels H. If now an endwise displacement is given the shaft carrying the adding-wheels, so as to bring the series of pinions $d'$ into engagement with the gears H, the wheels F and G may be reset to "0."

It is obvious that other forms of adding-wheels may be used instead of those above described, and I do not, therefore, wish to limit myself to the use of such wheels in connection with the other elements of the machine.

In order to provide a device for insuring the complete movement of any key before any other key will operate, catch mechanism may be employed. The catch mechanism may consist of a spring-pawl V, secured to the frame and adapted to engage a rack $v$ of the key. When the key is depressed, the pawl will pass freely over the teeth of the rack, but will be in such position as to prevent the return movement until the rack has gone entirely past it, when it will drop in such position as to allow the teeth to pass freely over it and allow the return of the key.

J represents an arm of each key-lever B, provided with a fork-like pawl device K, having two or more prongs of different lengths or differently placed attached thereto for the purpose of working the itemizing and numbering wheels L. These numbering-wheels may be arranged in sets of two or more, according to the registration requirement for each key, and a series of sets of numbering-wheels should correspond to the number of keys used for the purpose of classifying the sales or itemizing the business. These numbering-wheels L are placed side by side on a shaft common to all the series and are numbered around their periphery from "1" to "9" and "0." On one side of each wheel, and between them as they are side by side, is attached a toothed wheel $b$, and the other side of each wheel has within its hollow wall a spring $c$, capable of retaining the wheel fixed by means of its engagement with a recess in a disk $l''$, fast to the shaft, in spite of the friction of the adjoining one, until such a time as it is directly acted upon by the proper pawl-finger of the fork K, engaging its teeth. There is on each of these wheels L an indentation $d$, so graded as to permit of the engagement or disengagement of a finger-pawl of this forked projection or pawl device K when necessary. At the figure "8" or any other figure there extends a pin or projection M from the periphery of each wheel and at right angles to said pin, and running parallel to the series of wheels there extends a spring-actuated stop-bar M, mounted on pivoted arms $d$, and so arranged that it is capable of engaging the pins on the periphery of the numbering-wheels and holding them until the whole series of wheels shall show "0" on their upper surface, and shall then recede under the action of a spring and admit of any one or all passing on their course. The location of this stop-bar N, journaled at either end, will depend upon the point at which the pin is placed in the periphery of the numbering-wheel and that at which the number or zero is to be located.

O is a shaft extending throughout the entire series of numbering-wheels, and is provided with a handle $e$ at its end, by turning which the whole series of wheels are reduced to zero.

P is a series of spring-pawls designed to prevent any of the numbering-wheels from moving until the correct time.

The shaft O near one end is provided with a circular disk $g$, (best shown in Fig. 7,) having thereon a shoulder $h$. When the handle $e$ is turned, the shoulder is brought into engagement with a pin or projection $k$ on the arm $d$ of the stop-bar N, throwing said bar into such position that it will be engaged by the pins or projections M of the entire series of numbering-wheels and held therein at "0." Although these numbering-wheels are normally loose on the shaft O, so as to be moved independently under the action of the forked pawls, yet when said shaft is turned by means of its handle $e$ the friction of the springs $c$ which lie within the hollowed wall of each wheel and engage a disk $l''$, fast to the shaft, as hereinbefore described, will be sufficient to cause the entire series to be turned with the shaft.

Q is a segment-rack on the raised rear end of each key-lever B, which when said lever is depressed engages and turns the toothed wheel R of the rotary indicator I. This rotary indicator is connected to its toothed wheel R by a spring $l$, inclosed in and secured to a box $l'$, fast to said toothed wheel, and is provided with a stop-pin $p$ to engage a shoulder or catch $m$ of said box when said rotary indicator is returned to its initial position by said spring. The peripheral indicator is provided with a circumferential shoulder or catch $n$, in order that when it is turned sufficiently to expose the number marked thereon through the sight of the casing it will be engaged and held by the pawl-bar T.

The indicators are composed of a series of wheels or segments of the same, upon whose periphery is the amount indicated by the key, whose lever at its extremity Q gears into a toothed wheel R, connected to the side of each wheel or segment of the series, said wheels or segments being journaled on a shaft running parallel with the numbering-wheels. These wheels or segments are actuated by the racks Q, operating upon the toothed wheels R, while upon the inner wall of said wheels, segments, or sections is a coiled spring for returning the same to "0" when any other of the series of indicators is operated by its key.

The parts of the machine are so arranged that by the depression of any key A its lever B, moving upon the actuating bail-lever C, causes the wheel D to be turned through an arc corresponding to the value of the key struck, in order that the value of the key shall be at once added to the sum of the previous transactions on the wheels F G, while at the same time the corresponding movement of the arms J of said lever, actuating the pawl device K, registers on the numbering-wheels L the individual transaction already added, as aforesaid, to the sum of the previous transactions, while the extremity of the key-lever having the arc-shaped rack thereon has, by acting upon the toothed wheel connected to the indicator-wheels I, rotated the same to show the amount so registered and added at the sight opening or openings of the casement, and hence by depressing any key the amount corresponding to said key is at once indicated, recorded, and added to the sum of the previous transactions.

Having briefly described the working and purpose of this machine, what I consider new, and therefore desire to cover by Letters Patent, is—

1. The combination, with a series of pivoted key-levers having near their rear extremities a graduated series of lugs, of a continuous bar arranged above said lugs and common to the entire series and a series of adding-wheels operated by the movements of said bar under the depression of a key, each key-lever also having a toothed arm thereon operating a rotary indicator, substantially as specified.

2. The combination of a series of pivoted key-levers having thereon a graduated series of lugs, a continuous bar arranged above said lugs and common to the entire series, a series of adding-wheels operated by the movements of said bar, an upwardly-extending curved arm on each key at the rear of the lug and having a toothed extremity, and a series of rotary indicators having each a gear-wheel engaged by said toothed extremity, the parts being so arranged that the depression of any key simultaneously operates the adding and indicating mechanism to effect the proper indication and registration, substantially as specified.

3. The combination of the key-levers having upward toothed extensions, a series of rotary indicators, a gear-wheel connected to each indicator and actuated by the respective toothed extremity of the key, a spring connecting the gear-wheel and indicator, said spring being inclosed in a box fast to the gear-wheel, a stop-shoulder on said box, having engagement with a projection on the indicator, and the pawl mechanism for said indicator, substantially as specified.

4. In an indicating and accounting machine, the combination, with the series of key-levers, the individual itemizing-wheels operated thereby, and the adding mechanism and its gearing, of the rotary indicators having marked on their peripheries numbers corresponding to the value of the respective keys, said indicators being mounted loosely upon a common shaft, a series of pawls arranged to hold said indicators at their indicative position, releasing devices for releasing said pawls at the proper time, retracting-springs connected therewith, and a gear-wheel carried by each and engaged by a toothed arm of the respective key-lever, substantially as specified.

5. The combination, with the key-levers, of a series of sets of itemizing-wheels for registering the individual movements of the keys, one set for each lever, and operated thereby, said wheels being mounted upon a common shaft and held in engagement therewith by means of a spring bearing within the hollowed wall thereof and connected to a collar fast to the shaft, whereby said wheels are capable of an independent forward movement, but will move simultaneously in the opposite direction with the shaft, and a gear-wheel fast to each for engagement with the operating mechanism, substantially as specified.

6. The combination, with a series of key-levers, of a series of sets of individual itemizing-wheels operated thereby, one set for each lever, said wheels being mounted upon a common shaft and arranged to have an independent forward movement under the action of their respective operating devices, but to move simultaneously with their shaft in a reverse direction, a shouldered disk on one end of said shaft, a swinging stop-bar adjacent to the series of wheels and adapted to be moved into position to be engaged by stop-pins thereon, and a projection on an arm of said bar, adapted to be engaged by said disk when the shaft is turned to throw said bar into its stopping position, substantially as specified.

7. The combination of a series of sets of itemizing-wheels mounted upon a common shaft and arranged to have an independent forward movement thereon and a simultaneous reverse movement therewith and a stop-shoulder on each said wheel, a swinging stop-bar adjacent to said wheels and common to the series, and means whereby when said shaft is turned in a reverse direction said bar will be thrown into position to be engaged by said stop-pins when the wheels have been carried by the shaft to the proper position, substantially as specified.

8. The combination of a series of key-levers carrying a series of lugs, a common bar above said key-levers and acted upon by said lugs under the operation of the keys, a gear-wheel actuated by the movements of said bar, a series of adding-wheels operated from said gear-wheel, a series of sets of individual registering-wheels, one set for each key and operated upon by forked pawls connected to the key-levers, and a series of indicators operated by toothed extensions of said levers, substantially as specified.

9. The combination of a series of pivoted key-levers having thereon a graduated series of lugs, a continuous bar operated by the impingement therewith of any one of said lugs, a series of adding-wheels operated by the movements of said bar and provided with carrying-pinions and resetting devices, a series of rotary indicators having each a gear-wheel connected thereto, an integral upwardly-extending segment-arm on each lever at the rear of its lug engaging and operating said indicator-gear, a series of sets of itemizing-wheels, one set for each key and operated by an arm connected with the key-lever and carrying forked pawls having engagement with gear on said itemizing-wheels, and devices for resetting simultaneously the entire series of said itemizing-wheels to the zero position, substantially as specified.

In testimony whereof I affix my signature in presence of two witnesses.

HENRY G. O'NEILL.

Witnesses:
PHILIP C. MASI,
J. W. ANDERSON.